(12) United States Patent
Lee et al.

(10) Patent No.: US 11,662,503 B2
(45) Date of Patent: May 30, 2023

(54) RAINFALL MEASURING APPARATUS USING FIBER BRAGG GRATING SENSOR

(71) Applicant: FBG KOREA INC., Daejeon (KR)

(72) Inventors: Geum Suk Lee, Gyeryong-si (KR); Geum Jun Lee, Daejeon (KR)

(73) Assignee: FBG KOREA INC., Daejeon (KR)

( * ) Notice: Subject to any disclaimer, the term of this patent is extended or adjusted under 35 U.S.C. 154(b) by 7 days.

(21) Appl. No.: 17/393,754

(22) Filed: Aug. 4, 2021

(65) Prior Publication Data

US 2022/0091301 A1    Mar. 24, 2022

(30) Foreign Application Priority Data

Sep. 24, 2020  (KR) .................. 10-2020-0124196

(51) Int. Cl.
*G01W 1/14*      (2006.01)
*G01D 5/353*     (2006.01)
*G01D 11/24*     (2006.01)

(52) U.S. Cl.
CPC .......... *G01W 1/14* (2013.01); *G01D 5/35316* (2013.01); *G01D 11/245* (2013.01)

(58) Field of Classification Search
CPC .... G01W 1/14; G01D 5/35316; G01D 11/245
See application file for complete search history.

(56) References Cited

FOREIGN PATENT DOCUMENTS

| JP | 2006349370 A | * | 12/2006 |
| KR | 20090132188 A | * | 12/2009 |
| KR | 10-0992628 B1 | | 11/2010 |
| KR | 10-1034954 B1 | | 5/2011 |
| KR | 10-1057309 B1 | | 8/2011 |
| KR | 101567255 B1 | * | 11/2015 |
| KR | 101600573 B1 | * | 3/2016 |
| KR | 102106563 B1 | * | 5/2020 |

* cited by examiner

*Primary Examiner* — Jamel E Williams
(74) *Attorney, Agent, or Firm* — NKL Law; Jae Youn Kim (57) ABSTRACT

Discloses is a precipitation measuring apparatus using a fiber Bragg grating sensor, which includes: a base horizontally installed at a position for measuring precipitation; a cylindrical cover fixedly installed on the base; a bucket for collecting a predetermined amount of water introduced into the cover to discharge the collected water; and a detecting unit for detecting the number of times of discharging the water from the bucket by using the fiber Bragg grating sensor, wherein the change in the load applied onto the water collecting tank at a predetermined amount of water discharged from the bucket is detected using the fiber Bragg grating sensor, and the amount of precipitation is precisely measured using the number of changes in the wavelength of the light outputted from the fiber Bragg grating sensor.

7 Claims, 8 Drawing Sheets

RAINFALL MEASURING APPARATUS USING FIBER BRAGG GRATING SENSOR

BACKGROUND OF THE INVENTION

1. Field of the Invention

The present invention relates to a precipitation measuring apparatus, and more particularly, to a precipitation measuring for measuring the amount of precipitation using a fiber Bragg grating sensor.

2. Description of the Related Art

Precipitation refers to the depth of water that falls on a horizontal ground surface or a horizontal projection surface of the ground surface within a predetermined period of time and stagnates thereon without being evaporated or discharged.

The above precipitation collectively refers to the amount of rainfall measured after rain has fallen and the amount of snowfall measured after snow, hail and the like have fallen, refers to the depth of the water obtained by melting ice in the case that the precipitation is the ice such as snow, snow pellets, or hail, and includes dew, frost, and fog.

For example, Patent Document 1 below discloses a precipitation meter technology for measuring precipitation.

Patent Document 1 discloses the configuration of a tipping bucket type precipitation measuring apparatus operated in a seesaw type, in which a bucket for collecting introduced water is divided into left and right buckets, so as to be tilted toward the bucket filled with a certain amount of water around a rotating shaft to selfectively discharge the certain amount of water into a drain container.

The above tipping bucket type precipitation meter measures the amount of precipitation by detecting the number of operations of the tipping bucket by using an electric measuring sensor.

However, since the electric measuring sensor is applied, the tipping bucket type precipitation meter as in Patent Document 1 is very vulnerable to moisture from the precipitation, and may cause a malfunction due to lightning or the like when it rains.

Meanwhile, an optical fiber sensor refers to a sensor that estimates the amount to be measured by using changes in the intensity of light passing through an optical fiber, the refractive index, length and mode of the optical fiber, and a polarization state, and the like.

Light incident to an optical fiber core is reflected at an interface between a core layer having a high refractive index and a cladding layer having a low refractive index and propagated along the optical fiber core part.

The optical fiber sensor is classified into intensity type, phase type, diffraction grating type, mode modulation type, polarization type, and distribution measurement type according to used effects, and provides various measured values such as voltage, current, temperature, pressure, strain, rotation rate, sound, and gas concentration.

Accordingly, the optical fiber sensor is capable of ultra-precise broadband measurement, is not affected by electromagnetic waves, is capable of easy measurement, does not use electricity in a sensor unit, and has an excellent corrosion resistance due to a silica material, so there is no limit in using environments.

A representative of the optical fiber sensors is a fiber Bragg grating sensor type optical fiber sensor.

The fiber Bragg grating sensor refers to a sensor that uses properties in which a wavelength of light reflected from each Bragg grating varies according to changes in external conditions such as temperature or intensity, after several fiber Bragg gratings are engraved on a single fiber by predetermined lengths.

Accordingly, in the fiber Bragg grating sensor, a light refraction change is triggered in the grating when the optical fiber formed with the grating is deformed due to an action of physical force, and a strain speed of the optical fiber is measured by measuring the above refraction change, thereby measuring the strain speed of a structure to which the optical fiber is fixed, so that loads and stresses acting on the structure may be calculated.

The fiber Bragg grating sensor is formed by changing the refractive index of the optical fiber core part at a predetermined period, and accordingly, selectively reflects only the light having a specific wavelength.

The fiber Bragg grating sensor serving as an excellent physical quantity measuring device having a unique wavelength value and having excellent physical properties such as prevention of being affected by electromagnetic waves, and accordingly, has been replacing the conventional electric gauges, and recently, the applied scope is rapidly increasing.

Accordingly, the fiber Bragg grating sensor is used as a sensor that detects strain, angle, acceleration, displacement, temperature, pressure displacement, and the like, by using the principle of total reflection in which light within a predetermined angle is entirely reflected from an interface therebetween when light proceeds from a material having a high refractive index to a material having a low refractive index in the optical fiber.

For example, the applicant of the present invention has filed applications and received registrations on various technologies using the fiber Bragg grating sensor disclosed in the following Patent Document 1, Patent Document 2, etc.

Accordingly, the development of a technology is required for applying the fiber Bragg grating sensor to the precipitation meter to prevent malfunctions caused by external environmental conditions such as moisture or lightning, and increase the reliability on the precipitation measured by the precipitation meter.

(Patent Document 1) Korean Registered Patent No. 10-1034954 (Published in May 17, 2011)

(Patent Document 2) Korean Registered Patent No. 10-1057309 (Published in Aug. 16, 2011)

(Patent Document 3) Korean Registered Patent No. 10-0992628 (Published in Nov. 5, 2010)

SUMMARY OF THE INVENTION

In order to solve the problems as mentioned above, the present invention provides a precipitation measuring apparatus using a fiber Bragg grating sensor in which a seesaw type bucket detects the number of rotations by using the fiber Bragg grating sensor so as to accurately measure precipitation.

The present invention further provides a precipitation measuring apparatus using a fiber Bragg grating sensor to prevent malfunctions caused by external environmental conditions such as moisture or lightning, and provide precise measured values.

The present invention still further provides a precipitation measuring apparatus using a fiber Bragg grating sensor to measure both rainfall and snowfall.

In order to achieve the above-mentioned objects, the precipitation measuring apparatus using a fiber Bragg grating sensor according to the present invention includes: a base horizontally installed at a position for measuring precipitation; a cylindrical cover fixedly installed on the base; a bucket for collecting a predetermined amount of water introduced into the cover to discharge the collected water; and a detecting unit for detecting the number of times of discharging the water from the bucket by using the fiber Bragg grating sensor.

As described above, according to the precipitation measuring apparatus using the fiber Bragg grating sensor of the present invention, the change in the load applied onto the water collecting tank at a predetermined amount of water discharged from the bucket can be detected using the fiber Bragg grating sensor, and the amount of precipitation can be precisely measured using the number of changes in the wavelength of the light outputted from the fiber Bragg grating sensor.

Thus, according to the present invention, the fiber Bragg grating sensor is used, so that malfunctions caused by external environmental conditions such as moisture or lightning can be prevented, and the reliability on the precipitation measured by the precipitation meter can be increased.

In addition, according to the present invention, the detecting unit and the water collecting tank may be separately installed at different positions, and the detecting unit and the water collecting tank may be connected to each other by using the connection module, so that the optical fiber can be prevented from being cut or damaged due to the flux of the water collecting tank during movement.

In addition according to the present invention, the heating module may be applied to the precipitation measuring apparatus to heat and melt snow, snow pellets, hail, frost, and the like, and supply the water heated and melted to the water collecting tank, so that the amount of snowfall can be measured.

In addition, according to the present invention, the water is discharged to the ground through the discharge port and the discharge hose provided in the water collecting tank to control the speed of the water discharged from the water collecting tank, so that a measurement-available time for detecting the change in the load of the water collected in the water collecting tank can extend.

Thus, according to the present invention, measurement errors, which occur when the measurement-available time is shortened due to intensive rainfall within a short period of time, can be prevented, and the economic feasibility of the precipitation meter can be improved.

DETAILED DESCRIPTION OF THE INVENTION

Hereinafter, a precipitation measuring apparatus using a fiber Bragg grating sensor according to a preferred embodiment of the present invention will be described with reference to the accompanying drawings.

The present embodiment will be described based on the configuration of the tipping bucket type precipitation measuring apparatus cited in Patent Document 1.

It will be apparent that the present invention is not limited thereto, and various modifications may be available so as to repeatedly discharge a predetermined amount of precipitation.

Figure 1:
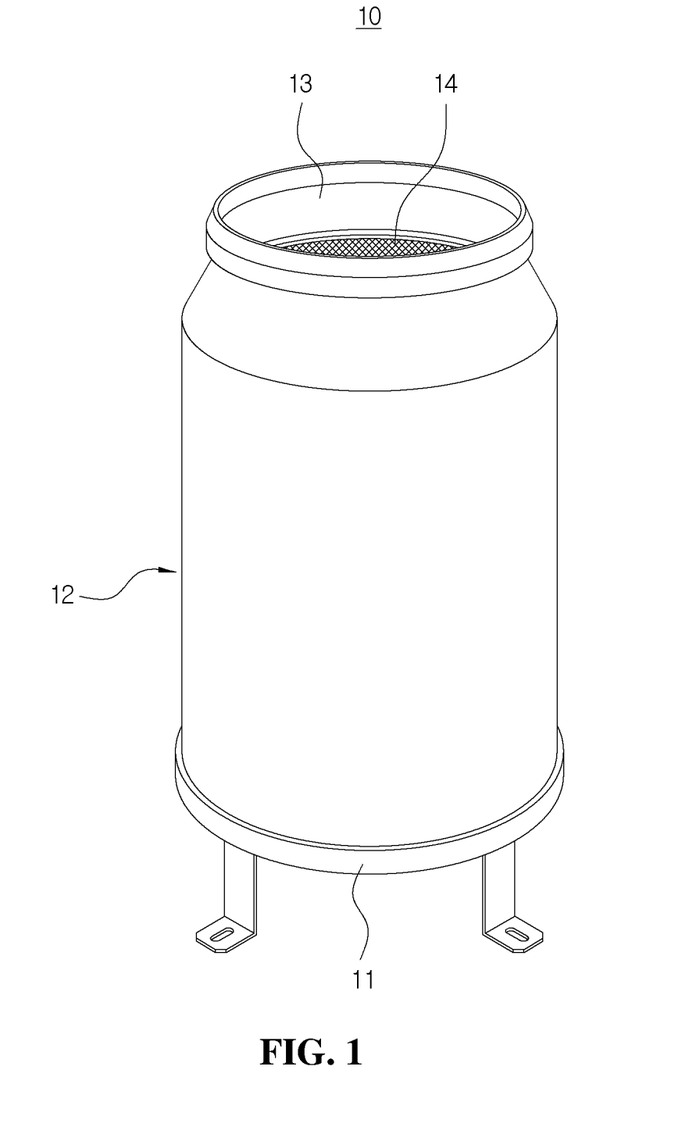
FIG. 1 is a perspective view showing a precipitation measuring apparatus using a fiber Bragg grating sensor according to a preferred embodiment of the present invention.
Figure 2:
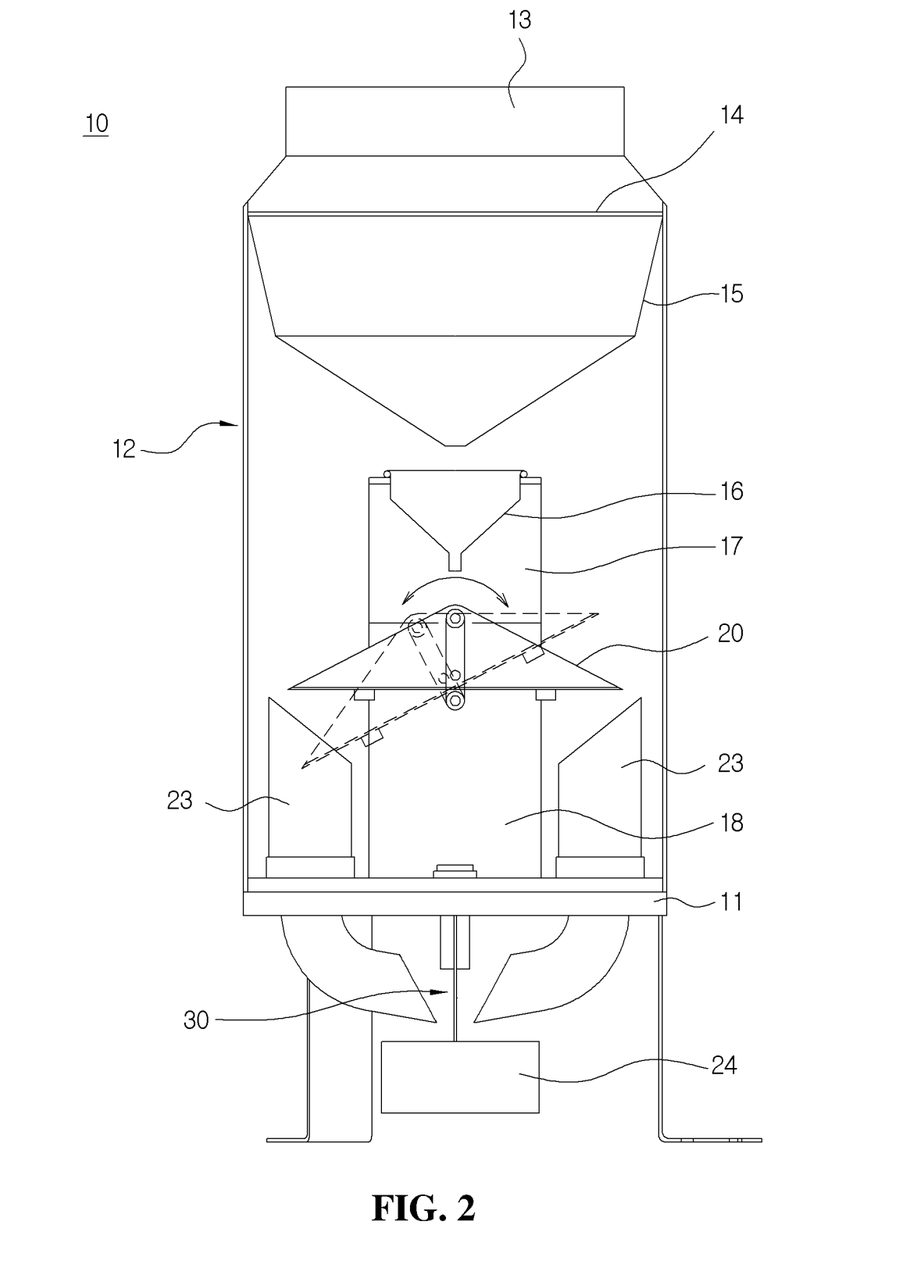
FIG. 2 is a schematic diagram showing the configuration inside the precipitation measuring apparatus shown in FIG. 1.
Figure 3:
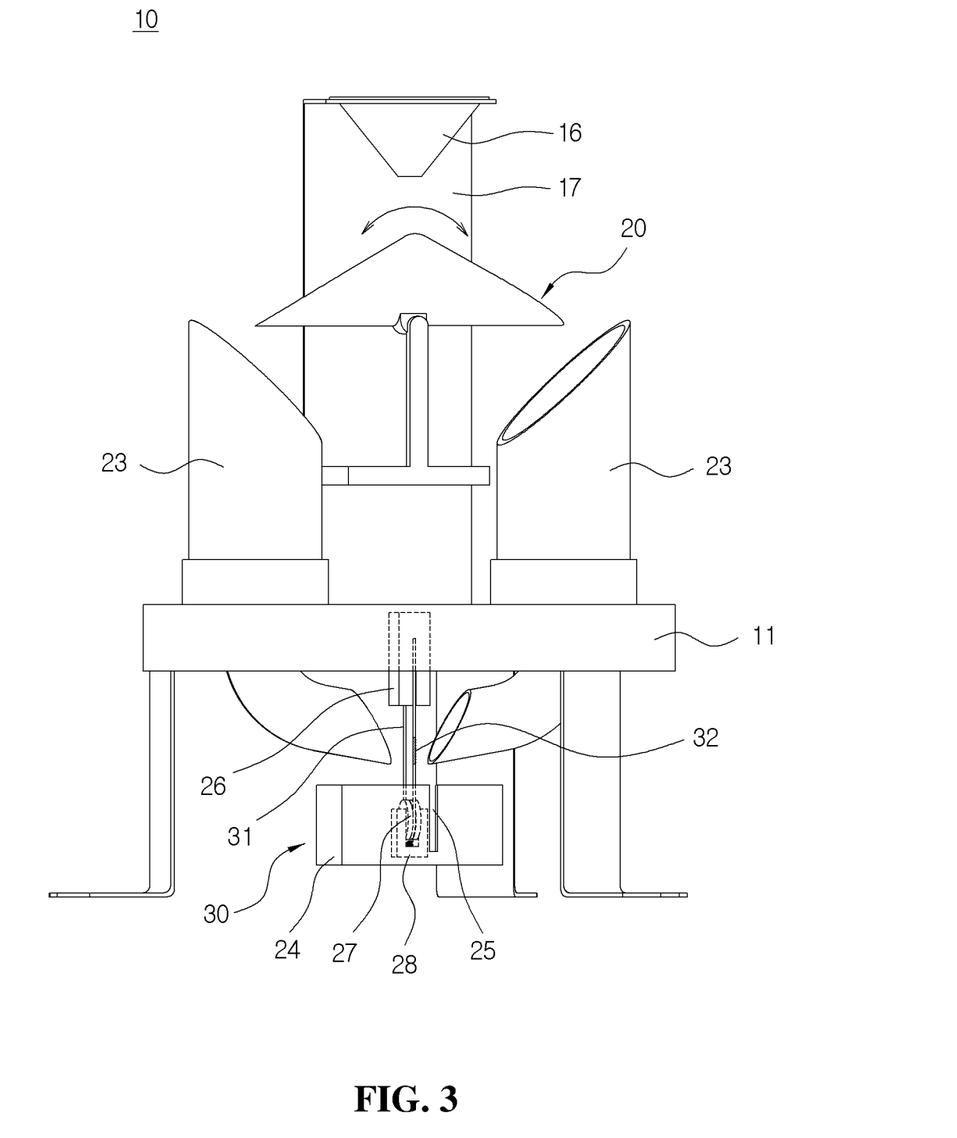
FIG. 3 is an enlarged view of the detecting unit shown in FIG. 2.

FIG. 1 is a perspective view showing a precipitation measuring apparatus using a fiber Bragg grating sensor according to a preferred embodiment of the present invention. FIG. 2 is a schematic diagram showing the configuration inside the precipitation measuring apparatus shown in FIG. 1. FIG. 3 is an enlarged view of the detecting unit shown in FIG. 2.

The terms indicating directions such as "left", "right", "front", "rear", "upper" and "lower" are defined to indicate directions on the basis of a status shown in drawings, respectively.

As shown in FIGS. 1 and 2, a precipitation measuring apparatus 10 using a fiber Bragg grating sensor according to a preferred embodiment of the present invention includes: a base 11 horizontally installed at a position for measuring precipitation; a cylindrical cover 12 fixedly installed on the base 11; a bucket 20 for collecting a predetermined amount of water introduced into the cover 12 and discharging the collected water; and a detecting unit 30 for detecting the number of times of discharging the water from the bucket 20 by using the fiber Bragg grating sensor 32.

The cover 12 may be formed with a water inlet 13 at an upper end thereof through which rainwater flows, in which the cover may be provided therein with a filtering net 14 and a water intake tank 15 for collecting rainwater introduced through the water inlet 13 to have a substantially funnel shape.

A water collecting cup 16 that collects water discharged through the water intake tank 15 and discharges the collected water stably downward may be installed in an upper bracket 17 under the water intake tank 15, and a bucket 20 that seesaws left and right according to the amount of rainwater dropped may be connected and installed to a lower bracket 18 under the water collecting cup 16.

Left and right water collecting units 21 and 22 each filled with a predetermined amount of water may be provided at both sides of the bucket 20.

In general, the precipitation meter includes 1.0 mm type and 0.5 mm according to a unit amount of rainwater to be measured.

In regard to the 1.0 mm type, the amount of precipitation when rainwater accumulates at a height of 1 mm on an area of 1 square meter (m2) is called '1', and the weight of rainwater at this time is about 31.42 g.

In regard to the 0.5 mm type, the amount of precipitation when rainwater accumulates at a height of 0.5 mm on an area of 1 square meter (m2) is called '0.5', and the weight of rainwater at this time is about 15.71 g.

The present embodiment will be described based on the 0.5 mm type.

A pair of drain pipes 23 for receiving the water contained in the bucket 20 while the water is discharged by the seesaw operation may be provided on the base 11 at lower ends of both sides of the bucket 20, respectively.

The precipitation meter according to the related art is install with drain cylinders (not shown), instead of the drain pipes 23, on both lower sides of the bucket 20 to guide the water discharged from the bucket 20 so as to be received and drained to the ground.

On the contrary, in the embodiment, the pair of drain pipes 23 may extend toward a lower part of the base 11, and a lower end of each of the drain pipe 23 may be disposed above a water collecting tank 24.

The water collecting tank 24 is fixed at a position spaced apart from the base 11 by a predetermined interval downward by an optical fiber 31 provided in the detecting unit 30.

A slit 25 for discharging the water, which is discharged through the drain pipes 23 and collected in the water collecting tank 24, to the outside may be formed at one side of the water collecting tank 24.

Accordingly, the detecting unit 30 may include the optical fiber 31 installed between a lower surface of the base 11 and the water collecting tank 24; and a fiber Bragg grating sensor 32 installed on the optical fiber 31 to detect the number of discharged times of water by the seesaw operation of the bucket 20.

As shown in FIG. 3, both ends of the optical fiber 31 may be fixed to a fixing block 26 installed to the lower part of the base 11, and a middle portion of the optical fiber 31 may be installed along an outer surface of a fixing member 27 installed in the water collecting tank 24.

The fixing member 27 may be formed in a substantially cylindrical shape, and may be installed on a shaft installed in the horizontal direction to an installation bracket 28 installed inside the water collecting tank 24.

Accordingly, one end of the optical fiber 31 may be fixed to one surface of the fixing block 26 and mounted along the outer surface of the fixing member 27, and then the other end of the optical fiber may be fixed to the other surface of the fixing block.

Light may be incident to one end of the optical fiber 31 from a measuring apparatus (not shown), and the other end of the optical fiber 31 may output light having a wavelength changed according to a load applied to the water collecting tank 24 as the incident light passes through the fiber Bragg grating sensor 32

Hereinafter, the one end of the optical fiber 31 to which the light is incident is referred to as an 'input end', and the other end of the optical fiber 31 through which the light is outputted is referred to as an 'output end'.

The measuring terminal may simultaneously monitor a plurality of precipitation measuring apparatuses 10.

To this end, the optical fiber 31 may be continuously installed in the precipitation measuring apparatuses 10.

In other words, the output end of the optical fiber 31 may be connected to an input end of the next precipitation measuring apparatus 10, and an output end of the optical fiber 31 installed in the precipitation measuring apparatus 10 provided at the final stage may be connected to the measuring apparatus again.

The fiber Bragg grating sensor 32 provided in each precipitation measuring apparatus 10 may output light having a different wavelength band according to the change in the load of the water collecting tank 24.

Accordingly, the measuring terminal can measure the amount of precipitation at different locations by simultaneously monitoring the consecutively connected precipitation measuring apparatuses 10 in real time using one optical fiber 31.

Meanwhile, FIG. 3 shows that both ends of the optical fiber 31 are connected to the fixing block 26 while the middle portion is wound around the fixing member 27 in order to maintain an equilibrium state of the water collecting tank 24, however, the present invention is not necessarily limited thereto.

In other words, the present invention may be modified such that the one end of the optical fiber 31 may be fixed to the fixing block 26, and the other end of the optical fiber 31 may be fixed to the water collecting tank 24, the fixing member 27, or the installation bracket 28 to fix the water collecting tank 24 by using a single strand of optical fiber 31.

Thus, according to the present invention, the change in the load applied onto the water collecting tank at a predetermined amount of water discharged by the seesaw operation of the bucket may be detected using the fiber Bragg grating sensor, and the amount of precipitation may be precisely measured using the number of changes in the wavelength of the light outputted from the fiber Bragg grating sensor.

Next, the coupling relationship and operation method of the precipitation measuring apparatus using the fiber Bragg grating sensor according to the exemplary embodiment of the present invention will be described in detail with reference to FIGS. 4 and 5.

Figure 4:
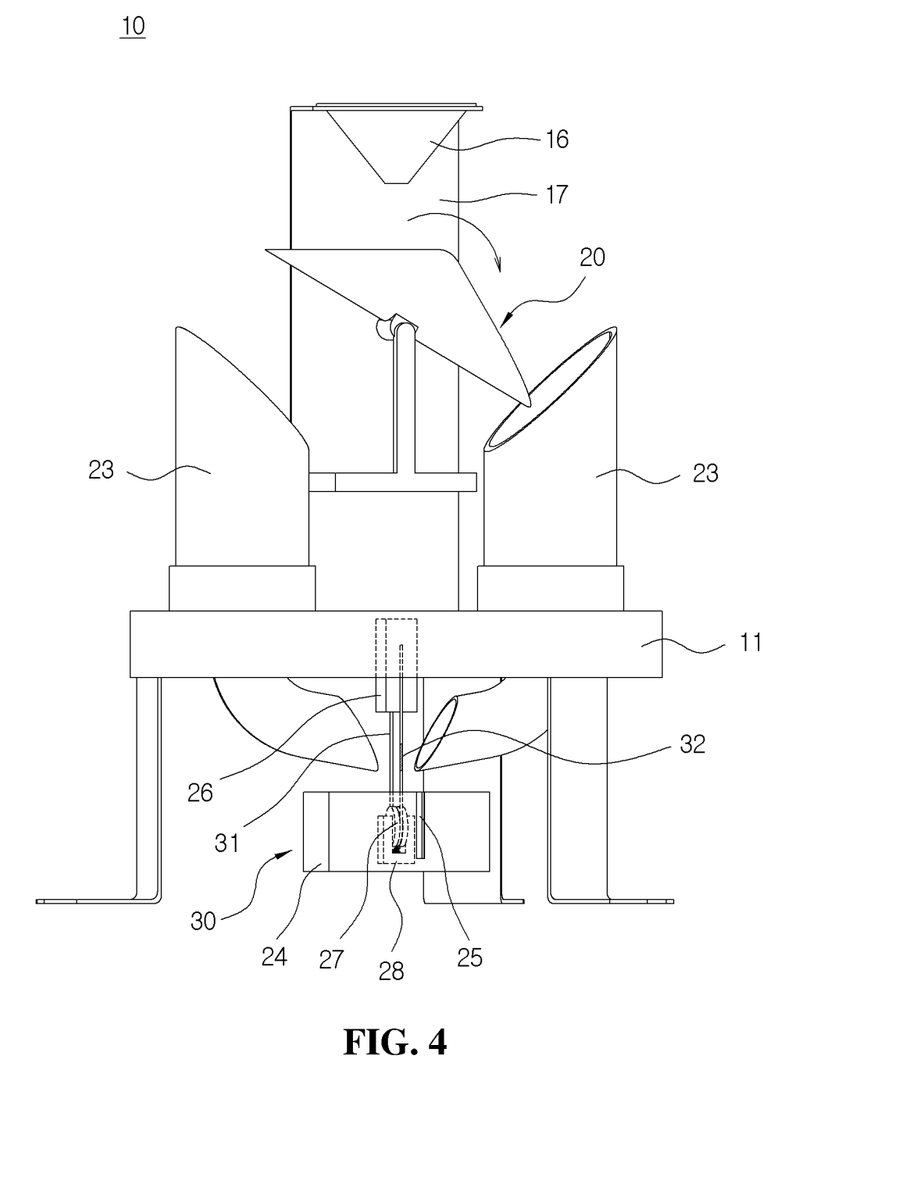
FIG. 4 is a view showing an operation state of the precipitation measuring apparatus using the fiber Bragg grating sensor according to a preferred embodiment of the present invention.

FIG. 4 is a view showing an operation state of the precipitation measuring apparatus using the fiber Bragg grating sensor according to a preferred embodiment of the present invention. FIG. 5 is a graph showing the wavelength of light outputted from the fiber Bragg grating sensor shown in FIG. 4.

FIG. 4 shows a state in which the bucket 20 rotates right downward to discharge a predetermined amount of water filled in the right water collecting unit 22.

First, the operator installs the upper bracket 17 on the upper part of the base 11, and installs the water collecting cup 16 on the upper bracket 17.

In addition, the operator installs the bucket 20 on the lower bracket 18 such that the bucket 20 can be seesawed in the left and right directions.

Left and right water collecting units 21 and 22 are provided at both sides of the bucket 200, and each of the water collecting units 21 and 22 rotates left or right downwards when a predetermined amount of water is filled.

For example, as shown in FIG. 4, when a predetermined amount of water is collected in the right water collecting unit 22, the bucket 20 rotates right downward to discharge the collected water. Then, the left water collecting unit 21 arranged upward collects water discharged from the water collecting cup 16.

To this end, the operator installs a pair of drain pipes 23 on both sides of the base 11, and connects a lower end of each drain pipe 23 to the water collecting tank 24.

The water collecting tank 24 is fixedly installed under the base 11 by using the optical fiber 31 provided in the detecting unit 30.

The operator arranges the middle portion of the optical fiber 31 along the outer surface of the fixing member 27 provided in the water collecting tank 24, and then fixes the both ends of the optical fiber 31 to the fixing block 26 installed on the lower surface of the base 11.

When the assembly of the precipitation measuring apparatus 10 is completed through the above process, the bucket 20 discharges the water filled by the seesaw operation when the predetermined amount of water is filled in the left or right water collecting unit 21 and 22 provided on the both sides.

The water discharged from the bucket 20 is filled in the water collecting tank 24 through the drain pipes 23.

Accordingly, the fiber Bragg grating sensor 32 outputs light having a wavelength changed according to the load acting on the water collecting tank 24, and the measuring terminal precisely measures the amount of precipitation by using the number of changes in the wavelength of the light received through the optical fiber 31.

Figure 5:
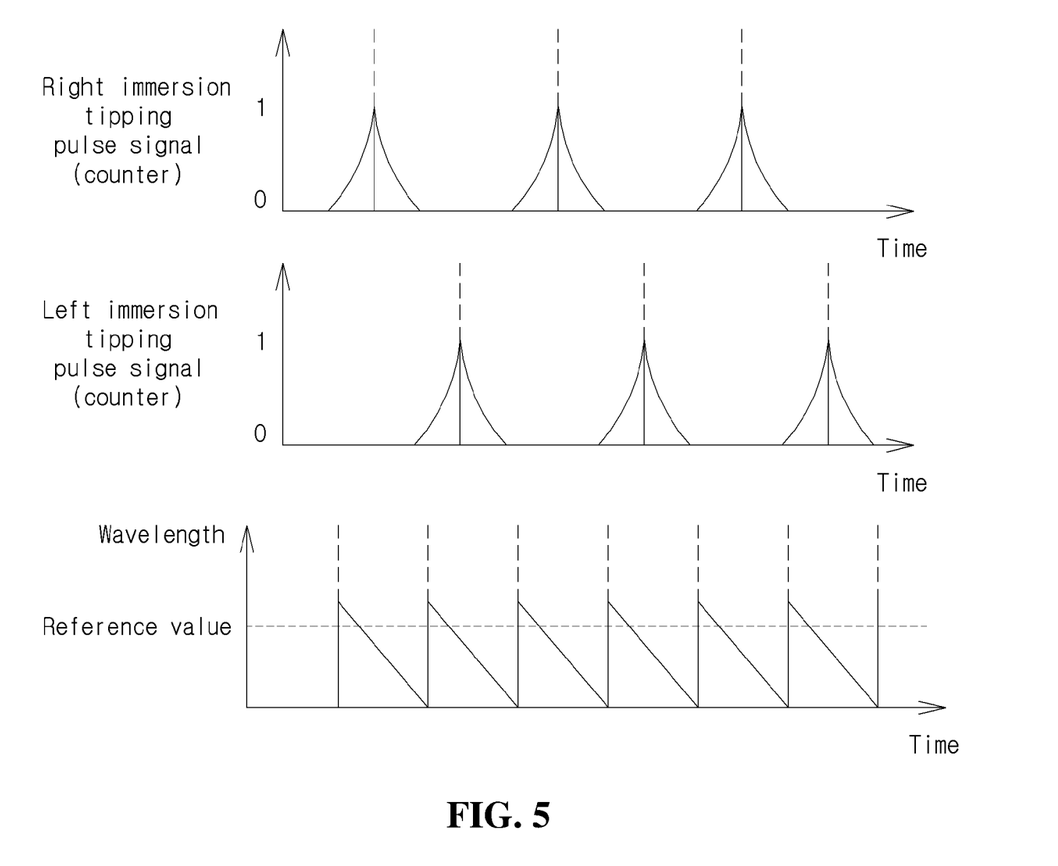
FIG. 5 is a graph showing the wavelength of light outputted from the fiber Bragg grating sensor shown in FIG. 4.

As shown in FIG. 5, the measuring terminal counts one time when a wavelength value of the light outputted from the fiber Bragg grating sensor 32 exceeds a predetermined reference value so as to measure the amount of precipitation by using the total number of counted time.

According to the present invention, through the processes described above, the change in the load applied onto the water collecting tank at a predetermined amount of water discharged by the seesaw operation of the bucket may be detected using the fiber Bragg grating sensor, and the amount of precipitation may be precisely measured using the number of changes in the wavelength of the light outputted from the fiber Bragg grating sensor.

Meanwhile, in the precipitation measuring apparatus 10 according to the above embodiment, the water collecting tank 24 is installed under the base 11 by using the optical fiber 31.

Accordingly, when a flux of the water collecting tank 24 occurs in the process of installing the precipitation measuring apparatus 10 first or moving the precipitation measuring apparatus 10 to move the installed position, there is a risk that the optical fiber 31 connecting the water collecting tank 24 to the base 11 may be broken or damaged.

In order to solve the problems mentioned as above, the present invention may be modified such that the water collecting tank 24 and the sensing unit 30 are separately installed and the load applied onto the water collecting tank is transferred to the detecting unit 30 by using a separate connection module.

Figure 6:
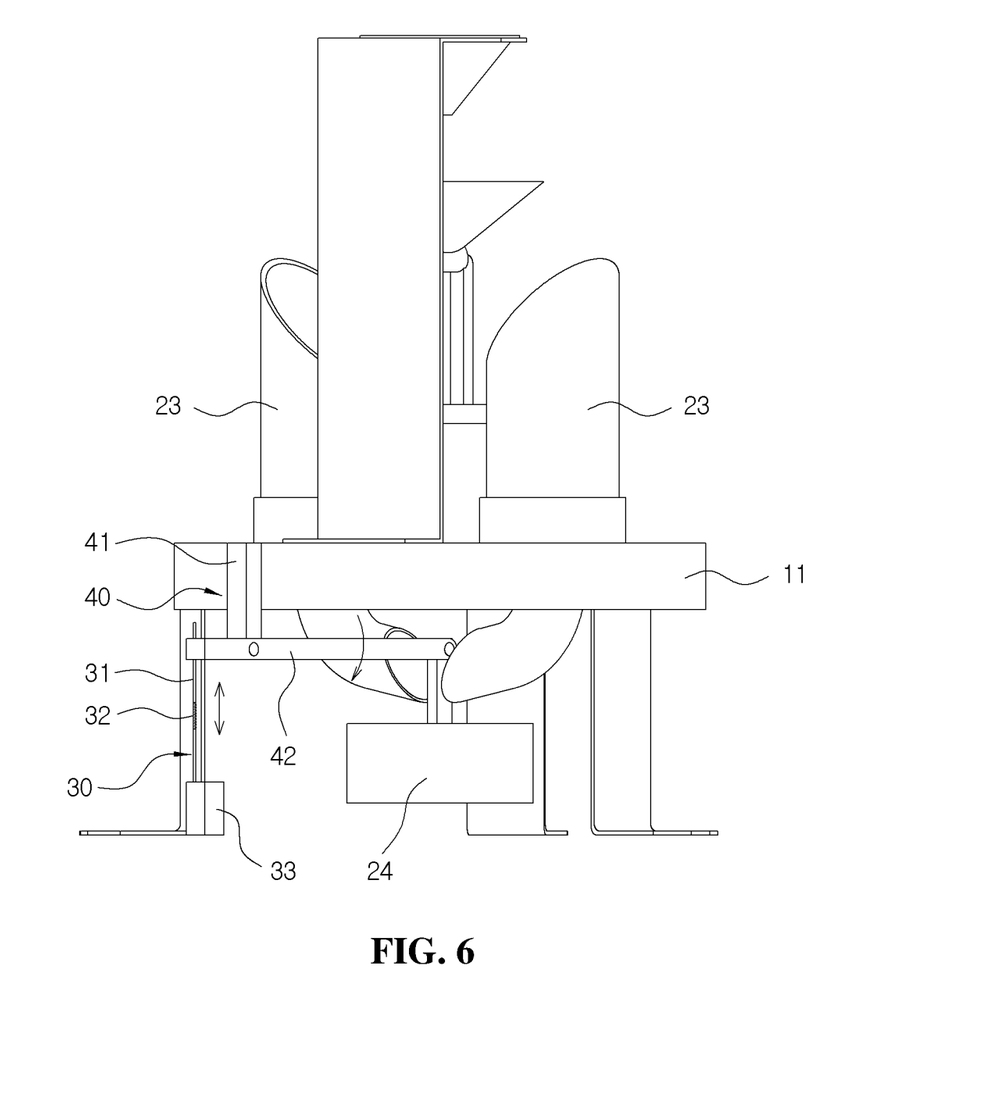
FIG. 6 is a partially enlarged view of the precipitation measuring apparatus using the fiber Bragg grating sensor according to another embodiment of the present invention.

For example, FIG. 6 is a partially enlarged view of the precipitation measuring apparatus using the fiber Bragg grating sensor according to another embodiment of the present invention.

As shown in FIG. 6, according to the precipitation measuring apparatus 10 using a fiber Bragg grating sensor according to another embodiment of the present invention, the water collecting tank 24 and the sensing unit 30 are installed separately from each other at different positions and connected to each other by the connection module 40.

The connection module 40 may include a support bar 41 installed in the vertical direction on one side of the base 11, and a connection bar 42 axially coupled to a lower end of the support bar 11 so as to be rotatable in a vertical direction around a rotation shaft. The connection bar 42 may have an inner end bent downward with a section having an approximately reversed and inverted 'L' shape.

The water collecting tank 24 may be installed at a position spaced apart from the lower end of the connection bar 42 by a predetermined interval, and the detecting unit 30 may be installed at an outer end of the connection bar 42.

In other words, the one end of the optical fiber 31, that is, the upper end when view in FIG. 1 may be fixed to the outer end of the connection bar 42, and the lower end of the optical fiber 31 may be fixed to an installation block 43 fixed to the ground or the cover 12.

Accordingly, the fiber Bragg grating sensor 32 installed on the optical fiber 31 may receive the change in the load applied onto the water collecting tank 24 through the connection bar 42 and output light having a wavelength changed according to the change in the load.

Thus, according to the present invention, the detecting unit and the water collecting tank may be separately install at different positions, and the load change may be detected by the rotational operation of the connection bar according to the change in the load applied onto the water collecting tank, so as to output the light having the changed wavelength.

Thus, according to the present invention, the optical fiber can be prevented from being cut or damaged due to the flux of the water collecting tank while the precipitation measuring apparatus moves.

The present invention may be modified to further include a stopper (not shown) for restricting the rotational operation of the connection bar 42 or fixing the water collecting tank 24 to prevent the flux of the water collecting tank 24.

The stopper may protrude from the lower surface of the base 11 to fix the connection bar 42, or may be provided between the water collecting tank 24 and the base 11 or between the water collecting tank 24 and the cover 12.

Figure 7:
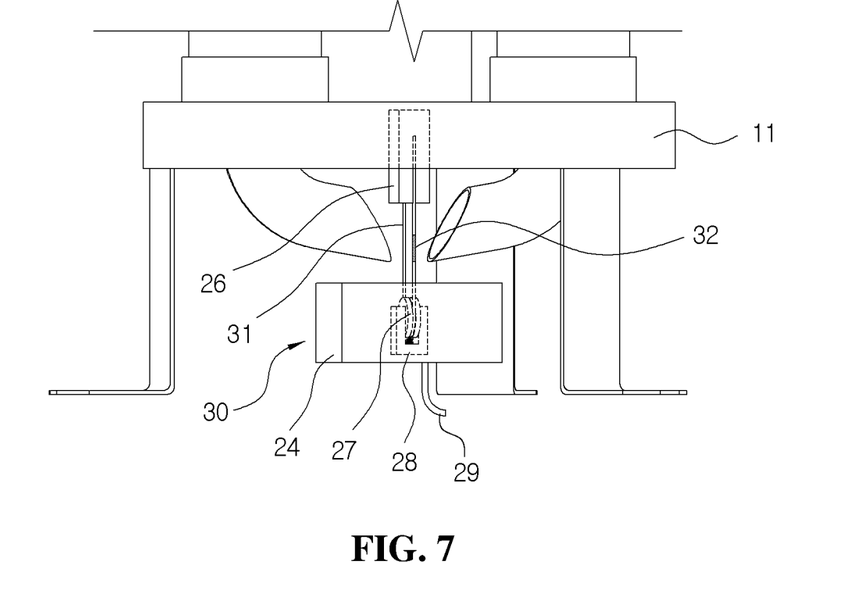
FIG. 7 is a partially enlarged view of the precipitation measuring apparatus using the fiber Bragg grating sensor according to still another embodiment of the present invention.
Figure 8:
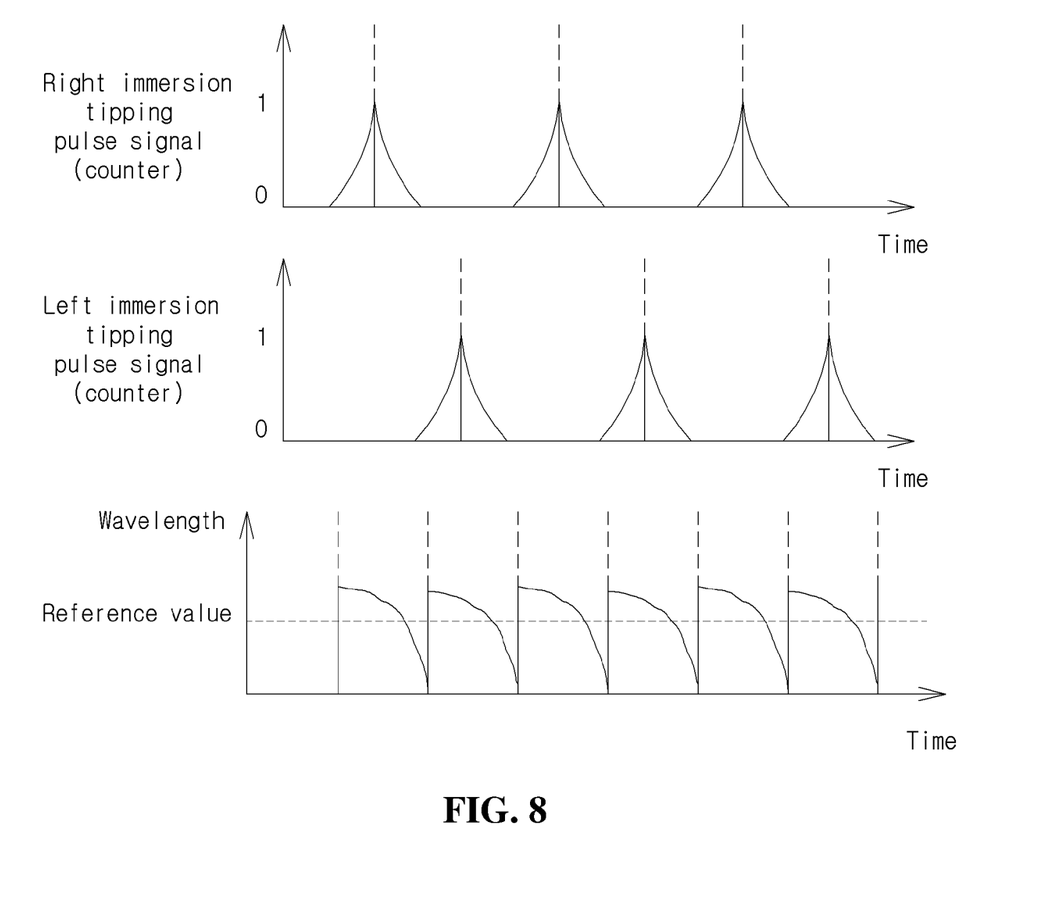
FIG. 8 is a graph showing the wavelength of light outputted from the fiber Bragg grating sensor shown in FIG. 7.

FIG. 7 is a partially enlarged view of the precipitation measuring apparatus using the fiber Bragg grating sensor according to still another embodiment of the present invention. FIG. 8 is a graph showing the wavelength of light outputted from the fiber Bragg grating sensor shown in FIG. 7.

As shown in FIG. 7, in the precipitation measuring apparatus 10 using the fiber Bragg grating sensor according to still another embodiment of the present invention, at least discharge port, instead of forming the slit 25 on the side of the water collecting tank 24, may be formed on the lower surface of the water collecting tank 24, and a discharge hose 29 may be connected to the discharge port.

Accordingly, the water collected in the water collecting tank 24 is discharged to the ground through the discharge port and the discharge hose 29.

In an initial phase when the water discharged from the water collecting tank 24 is discharged after the water is collected in the water collecting tank 24, the water has only potential energy, thereby being discharge at a relatively slow speed.

Whereas, when the discharged water reaches the ground through the discharge hose 29, the discharge speed gradually increases as the potential energy is converted into kinetic energy. Accordingly, as suction force for sucking the water collected in the water collecting tank 24 toward the discharge hose 29 is generated due to viscosity of the water, the speed of the water discharged from the water collecting tank 24 gradually increases.

Thus, in the present embodiment, the initial discharge speed of the water collected in the water collecting tank may decrease, and the discharge speed of the water may gradually increase as time passes.

Accordingly, as shown in FIG. 8, the light outputted from the fiber Bragg grating sensor 32 maintains a wavelength value higher than the reference value when the water is initially discharged, and the wavelength value decreases rapidly as the initially discharged water reaches the ground and the discharge speed increases.

In other words, compared to the wavelength value of the light shown in FIG. 5, it can be seen that the wavelength value of the light shown in FIG. 8 is maintained over the reference value for a longer time.

Thus, according to the present invention, the water is discharged to the ground through the discharge port and the discharge hose provided in the water collecting tank to control the speed of the water discharged from the water collecting tank, so that a measurement-available time for detecting the change in the load of the water collected in the water collecting tank may extend.

Thus, according to the present invention, measurement errors, which occur when the measurement-available time is shortened due to intensive rainfall within a short period of time, can be prevented, and the economic feasibility of the precipitation meter can be improved.

Meanwhile, as mentioned above, the precipitation measuring apparatus 10 measures rainfall and snowfall.

To this end, according to the present invention, a heating module such as a heating coil may be applied to the cover, filtering net, water intake tank, or water collecting cup to heat and melt snow, snow pellets, hail, frost, and the like, and supply the water heated and melted to the water collecting tank so as to measure the amount of snowfall.

In other words, the present invention may be modified such that a precipitation measuring apparatus for measuring the amount of rainfall is installed separately from a precipitation measuring apparatus applied with the heating module to measure snowfall, or a single precipitation measuring apparatus applied with the heating module may be used so as to measure both rainfall and snowfall.

To this end, the precipitation measuring apparatus applied with the heating module may be configured to be connected to the measuring terminal to communicate with each other, and drive the heating module according to the control signal of the measuring terminal, thereby heating snow and the like. In addition, the heating module may be supplied with power through a power supply unit of the measuring terminal, or supplied with power from a power generation module such as a photovoltaic module installed together with the precipitation measuring apparatus.

The present implemented by the inventor has been described in detail according to the above embodiments, however, the present invention is not limited to the embodiments and may be modified variously within the scope without departing from the invention.

The present invention may be applied to a technology of a precipitation measuring apparatus using a fiber Bragg grating sensor for measuring the amount of precipitation using the fiber Bragg grating sensor.

What is claimed is:

1. A precipitation measuring apparatus using a fiber Bragg grating sensor, the precipitation measuring apparatus comprising:
a base horizontally installed at a position for measuring precipitation;
a cylindrical cover fixedly installed on the base;
a bucket for collecting a predetermined amount of water introduced into the cover to discharge the collected water; and
a detecting unit for detecting a number of times of discharging the water from the bucket by using the fiber Bragg grating sensor,
wherein the base is provided at a lower portion thereof with a water collecting tank for collecting the water discharged from the bucket, and
wherein the detecting unit includes
an optical fiber installed between the base and the water collecting tank, and
the fiber Bragg grating sensor installed on the optical fiber to detect the number of discharging times of the predetermined amount of water from the bucket to the water collecting tank, in which the fiber Bragg grating sensor outputs light having a wavelength changed according to a load applied onto the water collecting tank.

2. The precipitation measuring apparatus of claim 1, wherein the detecting unit is provided on one side of the base,
the detecting unit is connected to the water collecting tank by a connection module,
the connection module includes a connection bar having both ends connected to the water collecting tank and one end of the optical fiber,
an opposite end of the optical fiber is fixed to an installation block fixed to the cover or the ground, and
the connection bar rotates in a vertical direction about a rotation shaft according to the change in the load applied to the water collecting tank.

3. The precipitation measuring apparatus of claim 1, wherein the base is provided with a pair of drain pipes for discharging water discharged from left and right water collecting units provided on both sides of the bucket to the water collecting tank, respectively, and
the water collecting tank is formed at one side thereof with a slit for discharging water collected therein to an outside.

4. The precipitation measuring apparatus of claim 1, wherein the base is provided with a pair of drain pipes for discharging water discharged from left and right water collecting units provided on both sides of the bucket to the water collecting tank, respectively,
the water collecting tank is formed therein with a discharge port for discharging the water collected therein to an outside to extend a measurement-available time for detecting the change in the load of the water collecting tank by adjusting a speed of water discharged from the water collecting tank, and
a discharge hose for guiding the discharged water to the ground is connected to the discharge port.

5. The precipitation measuring apparatus of claim 1, wherein light irradiated from a measuring terminal is incident onto one end of the optical fiber,
an opposite end of the optical fiber is connected to the measuring terminal or another optical fiber of a next precipitation measuring apparatus, and
the measuring terminal simultaneously measures amounts of precipitations at a plurality of locations by using light outputted from a plurality of precipitation measuring apparatuses connected to the optical fiber.

6. The precipitation measuring apparatus of claim 1, further comprising a stopper for fixing the water collecting tank to prevent a flux of the water collecting tank during movement.

7. The precipitation measuring apparatus of claim 1, further comprising a heating module for heating and melting ice when the precipitation introduced through the cover is the ice.

\* \* \* \* \*